R. HOADLEY.
THREE-HORSE EQUALIZER.

No. 185,636.  Patented Dec. 26, 1876.

Figure 1:
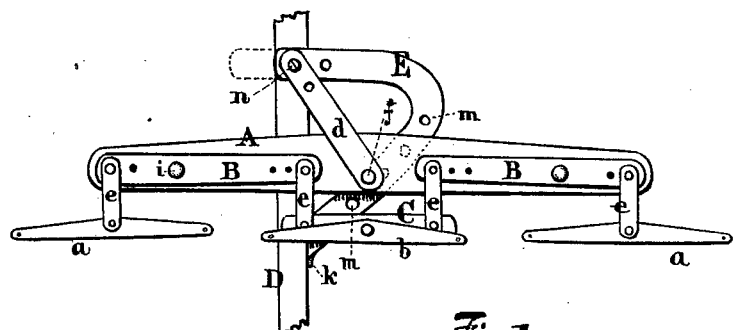

(Side elevation of fig. 1).

Witnesses.
Edward Adams.
Hamilton Thornton.

Richard Hoadley.
(by E. Thurlow, his atty in fact.)

THE GRAPHIC CO. N.Y.

UNITED STATES PATENT OFFICE.

RICHARD HOADLEY, OF TOULON, ILLINOIS.

IMPROVEMENT IN THREE-HORSE EQUALIZERS.

Specification forming part of Letters Patent No. 185,636, dated December 26, 1876; application filed September 30, 1876.

*To all whom it may concern:*

Be it known that I, RICHARD HOADLEY, of Toulon, in the county of Stark, and in the State of Illinois, have invented an Improvement in Three-Horse Draft-Equalizers; and do hereby declare that the following is a full, clear, and exact description thereof, reference being had to the annexed drawings, making a part of this specification, in which like letters of reference refer to like parts, and in which—

Figure 2:
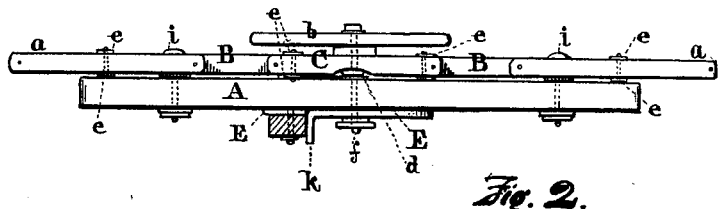
Figure 3:
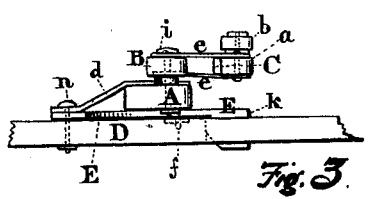
Figure 4:
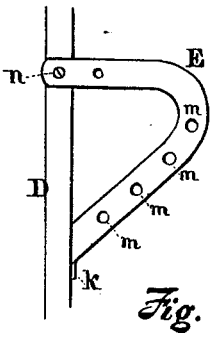

Figure 1 represents a plan view; Fig. 2, a front elevation; Fig. 3, end elevation from left hand; Fig. 4, plan view of adjusting-plate E.

This equalizer is designed to be pivoted, by the center of the main bar, to the object to be drawn, or to a triangular plate or loop attached to, and projecting laterally from, the tongue of a vehicle or implement, or from the beam of a plow. This plate is employed only when the tongue would be in the way of the central horse, or when, in plowing, part of the number of draft animals walk in the furrow, or for similar contingencies.

It consists, first, of a main bar, (double-tree,) having a pivot at its center, and at each end, pivoted thereto, corresponding levers of unequal length—*i. e.*, having two-thirds of their respective lengths between their pivots and their inner extremities, leaving a space between their respective inner ends for the adjustable attachment to said ends of a short bar, parallel to the double-tree, and connected to said ends by means of links or rigid straps pivoted to adjustable bolts or pins, (in several holes,) for the purpose of adjusting the draft to the animals by throwing onto or relieving the center animal of a portion of said draft. To the short center-bar is pivoted the middle single-tree, and to the outer ends of the respective levers, which are in like manner provided with several pivot-holes, are their respective single-trees, attached by means of straps or swinging braces. The equalizer, as described, can be pivoted to the center of the vehicle or implement without tongue. But for attaching the same to a plow or tongued vehicle, second, I use a triangular horizontal plate, pivoted at its rear angle to the tongue or plow-beam, (so as to project laterally on the side on which two of the draft animals are to pull,) having several pivot-holes diverging in a line from the tongue, intended to throw the center of the double-tree farther from the tongue, on the two-horse side. I use, in connection with said plate and double-tree, a brace running direct from said pivot to the pivot of the plate on the tongue or beam, which brace, as well as the pivot of the plate, has several adjusting-holes. This brace may be used (or a similar one) to pass from the double-tree pivot to that of the central bar, to prevent the latter from being drawn back over the double-tree.

In the drawing, which represents one of the forms in which I construct this equalizer, A is the double-tree; B B the equalizing-levers, connected at their inner ends, by separate straps $e\ e$, with the central bar C, and at their respective outer ends to a single-tree, $a\ a$. $b$ represents the third single-tree, pivoted on the center-bar C; D, the tongue of the vehicle or other object; E, the triangular adjusting-plate for the attachment of the double-tree, pivoted at $n$ to the tongue or to the plow-beam, ending forward in a vertical shoulder, $k$, for its abutment against the side of said tongue D; $d$, a brace extending from pivot $n$ to the double-tree pivot $f$.

The operation of this equalizer is as follows: The central bar C, connecting the inner ends of the levers B B, allows free play to said equalizing-levers at this point, (instead of being limited and tied together here, as heretofore, and connected with the single-tree by means of one strap;) for, by reason of the lateral oscillation permitted to said bar C by the separate straps $e\ e$, the center draft animal is much relieved from sudden jerks or pulls from the side animals, the strain being spent between the six pivots before reaching the horse. The equalizer can be attached as well to tongued vehicle or implement as to one without a tongue. The plate E will throw the main draft on one side of the center of the object drawn. Again, the various holes or attachments for the straps $e$ to different points at each end of the respective levers B B increase the means for the nice adjustment of the draft between the animals. Again, the center-bar C, as attached, allows considerable end swing or lateral sway, and prevents the galling of the neck of the horse, and, by being placed in advance of the levers, allows a range forward and backward of at least of the space of two feet.

What I claim as my invention is—

1. The combination, with the tongue D and double-tree A, bearing the unequally-pivoted levers B B, of the pivoted swinging draft-adjusting plate E, when constructed with adjusting-holes m m, &c., flange k, or bearing against the side of the tongue D, substantially as described.

2. The combination and connection of the adjacent ends of the levers B B, with straps e e, and the swinging bar C, to allow the said ends of said bars greater play in contrary directions, to obviate the sudden pulls upon the central single-tree and horse, substantially as described.

In testimony that I claim the foregoing I have hereunto set my hand this 1st day of September, A. D. 1876.

RICHARD HOADLEY.

Witnesses:
 WM. CHAMBERLAIN,
 FRANK W. FULLER.